United States Patent [19]

Deering

[11] Patent Number: 4,763,435
[45] Date of Patent: Aug. 16, 1988

[54] FISHING ROD HOLDER

[76] Inventor: Richard H. Deering, P.O. Box 765, Eagle, Colo. 81631

[21] Appl. No.: 44,157

[22] Filed: Apr. 30, 1987

[51] Int. Cl.$^4$ ............................................. A01K 97/10
[52] U.S. Cl. .................................................... 43/21.2
[58] Field of Search ................ 43/21.2, 26.1; 248/520, 248/538

[56] References Cited

U.S. PATENT DOCUMENTS

| | | | |
|---|---|---|---|
| 3,186,666 | 6/1965 | Williams | 43/21.2 |
| 3,346,987 | 10/1967 | Cornwell | 43/21.2 |
| 3,546,805 | 12/1970 | Schaeffer | 43/21.2 |
| 3,793,761 | 2/1974 | Bonham | 43/26.1 |
| 4,640,039 | 2/1987 | O'Neill | 43/21.2 |
| 4,671,009 | 6/1987 | Faunce | 43/21.2 |
| 4,694,603 | 9/1987 | Anderson | 43/21.2 |

*Primary Examiner*—Gene P. Crosby

[57] ABSTRACT

The fishing rod holder attaches to a fishing rod and supports the rod and reel at a desired angle when set on surfaces such as earth, ice or in a boat. The rod holder is used while still-fishing, a fishing technique whereby the rod and reel is not held in the hand while waiting for a fish to take the bait. The rod holder keeps the rod and reel out of sand, snow, mud, dirt, etc. The rod holder remains attached to the rod during all fishing activities. The rod holder detaches easily and folds flat for storage or carrying.

2 Claims, 2 Drawing Sheets

FISHING ROD HOLDER

BACKGROUND OF THE INVENTION

At the present time general method of keeping a fishing rod and reel at a desired angle while fishing from a bank is the use of a forked stick, rock, log or something else to prop up the rod and reel. The said items are not always readily available and are most often unsatisfactory make-shift attempts to solve the problem. Often the ground is too hard or rocky to push a stick into and logs are hard to find or move as are rocks.

There are a variety of metal "stake" rod holders on the market which are pushed into the ground and will function if the ground is sand or soft dirt. However most will rust, are a bit heavy and cumbersome and they won't work on hard ground, rocky areas, piers, boats or ice. There are rod holders for boats which won't work anywhere else. There is even an ice-fishing rod with a built-in support for setting it on the ice. However the pole is so short that it is only suitable for ice-fishing. Also, it does not allow for interchanging rods.

Without a suitable support for rod and reel, said rod and reel are repeatedly subjected to damage from dirt, sand, mud and other enviornmental materials which foul and damage the internal parts of reels and surfaces of the rod and line. Damage to rod and reel can also be caused by being stepped on while laying on the ground, dock or ice. In addition, none of the existing rod holders will float a rod and reel.

To overcome the shortcommings of existing methods, the present invention is designed to be used with standard or ultra-lite fishing rods and reels. This rod holder easily attaches to the rod butt and sits on any surface such as snow, ice, rocky ground, mud, boat surfaces and docks. It can be easily adjusted to a wide variety of angles relative to the water being fished. In the event that the rod is pulled or knocked into the water, the said rod holder will float thereby allowing the equipment to be retrieved. Said rod holder supports the rod and reel up-off of enviornmental surfaces and makes it difficult to accidentally step on the said rod and reel. Since said rod and reel remain attached to said rod holder during all fishing activities there is practically no time said rod and reel can be set directly on the environmental surface thereby risking damage to said rod and reel. Said rod holder is light weight and durable, easy to use and versitile. The low cost of production makes said rod holder available for the majority of consumers.

SUMMARY OF THE INVENTION

The present invention is a system designed to hold a fishing rod and reel up off of enviornmental surfaces thereby protecting said rod and reel while holding said rod and reel at a desirable angle relative to the body of water being fished.

Another object of the invention is to make it light weight and highly portable. Said rod holder is constructed of light weight Polyvinyl Chloride pipe and fittings hereafter referred to as PVC. Said rod holder is light and durable. Said rod holder can be twisted to make said rod holder lay flat for packing.

A further object of the invention is to have said rod holder be bouyant as a means of being able to retrieve said rod holder and fishing equipment from the water.

A still further object of the invention is to make the means of attaching the rod butt to the said rod holder as universal as possible due to differences in rod butt sizes. Double-sided VELCRO straps are used to accomplish this.

Another object of the invention is to connect said rod holder to the rod instead of the rod holder being separate thereby greatly reducing the chances of leaving the rod holder behind due to forgetfulness.

One other object of the invention is to provide support and protection for the rod and reel while baiting hooks, changing tackle or removing fish from hook.

One last object of the invention is the optional sensitivity adjustment. Said rod holder can be twisted into such a shape that when a strike from a fish has occured without being noticed (a strike hard enough to have possibly stripped the bait), said rod, reel and holder will tip forward allerting the fisherman.

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
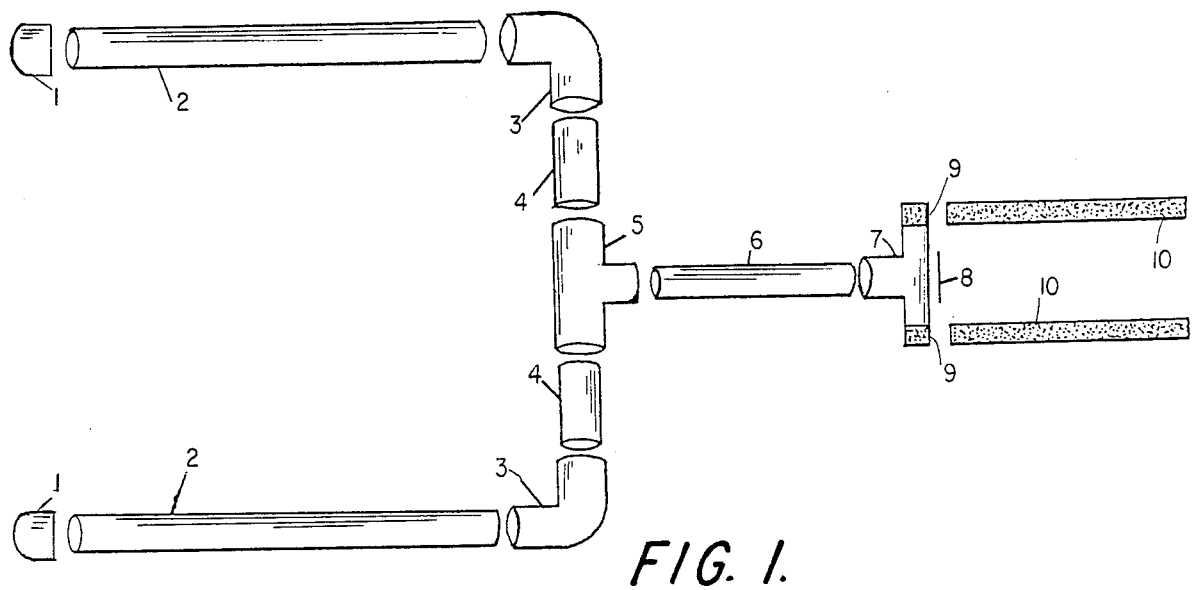
FIG. 1 is an exploded view of the rod holder.
Figure 2:
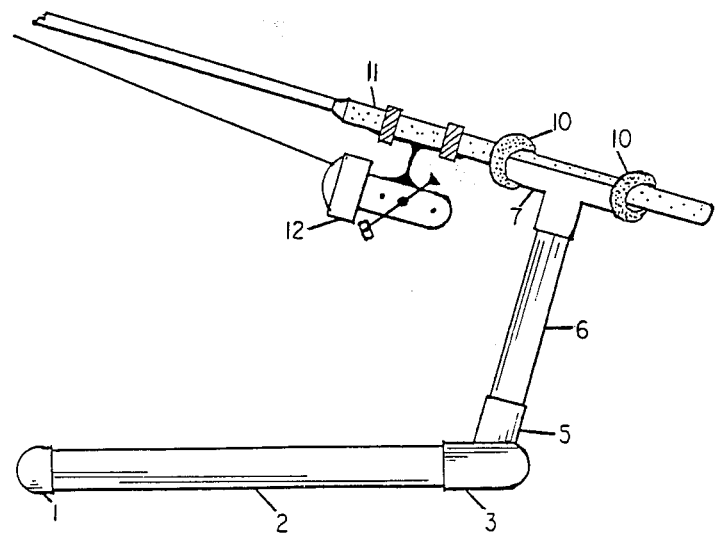
FIG. 2 is an plan view of the rod holder in an operable position with a rod and reel attached.
Figure 3:
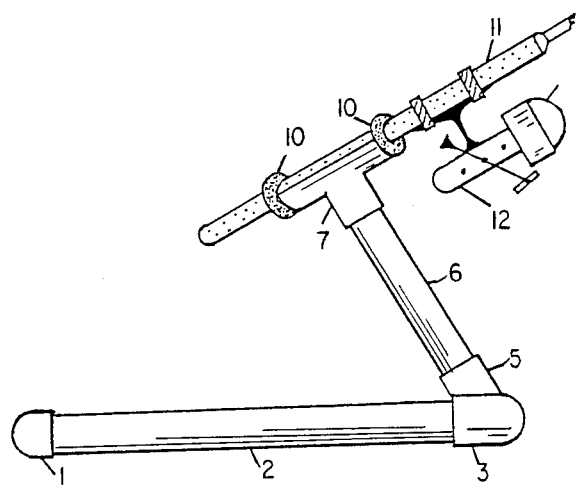
FIG. 3 is a plan view of the rod holder in the sensitivity position.
Figure 4:
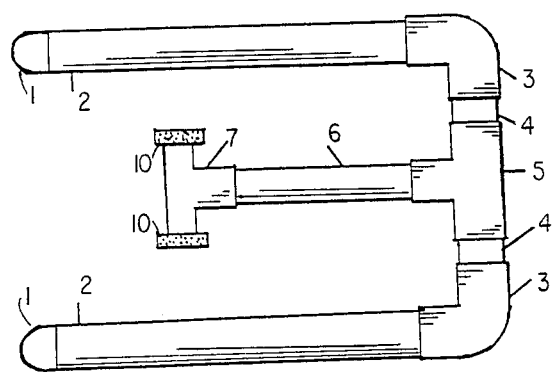
FIG. 4 is a plan view of the rod holder in the folded, packing position.
Figure 5:
FIG. 5 is a front view of the rod holder cradle which accepts the rod butt.

Referring to the drawing shown in FIG. I, numeral 1 designates a ½ inch PVC cap that is cemented onto the ½ inch PVC pipe leg piece designated numeral 2. PVC cement is used to cement all parts as designated.

Numeral 3 designates a ½ inch 90 degree PVC joint which is cemented to the piece designated numeral 2. Numeral 4 designates a piece of ½ inch PVC pipe which is cemented to the part designated numeral 5 and is not cemented to the piece designated numeral 3. This allows movement of piece designated numeral 3 for angle adjustments. Numeral 5 designates a ½ inch PVC "T" joint. Numeral 6 designates a piece of ½ inch PVC pipe which is cemented into piece designated numeral 5. Numeral 7 designates a ½ inch by ¾ inch by ¾ inch PVC "T" joint which has had the top half cut off. This open top half accepts and cradles the rod butt. The joint between numeral 6 and numeral 7 is not cemented allowing for movement of part designated numeral 7. Numeral 8 designates a 1 inch by 1½ inch piece of duct tape used to seal the hole in the end of the "T" joint designated numeral 7 thereby sealing the unit and making it water tight and bouyant. Numeral 9 designates a piece of ¾ inch by 2 inch VELCRO with a sticky side which is attached to the underside of each end of the piece designated numeral 7. Numeral 10 designates a piece of ¾ inch by 6 inch VELCRO material which is formed by joining two ¾ inch by 6 inch pieces of sticky-sided VELCRO material with the hooks on one side and the material the hooks connect with on the other side.

In FIG. II, all numerals designate the same parts as designated in FIG. I with the exception of numeral 11 which designates the butt of a fishing rod and numeral 12 which designates a fishing reel. FIG. II illustrates the said rod holder attached to a rod and reel in one of the fishing positions.

In FIG. III the said rod holder is shown attached to a rod and reel in the sensitive position. All numerals are the same as designated in FIG. II.

FIG. IV the said rod holder is in the folded or packing position. All numerals indicated are the same as designated in FIG. I.

FIG. V shows a front view of the cradle designated numeral 7. The dotted line designates the top half which has been cut off.

FIGS. II, III, and IV do not show part designated by numeral 9 as that part is covered by part designated by numeral 10. The part designated by numeral 8 is also not shown as it is in position out of sight or covered by the rod butt.

It is thus seen from the preceding description that the rod holder will adjust to different angles relative to the surface of the water being fished and that it will hold the rod nd reel above a solid surface. It can also be seen that said rod holder is sealed to provide bouyancy. It can be further seen that said rod holder will accept a variety of fishing rod butt sizes as accommodated by the VELCRO straps.

In addition, the commonly known characteristics of PVC pipe gives said rod holder the qualities of being light weight and durable, as well as low cost for production.

As an outer finish, said rod holder is dipped in a solution consisting of 50% black oil based enamel paint and 50% clear Gym Seal.

The disclosure of the invention described herein above represents the preferred embodiments of the invention; however, variations thereof, in the form, size, construction, and arrangement of the various components thereof and the modified application of the invention are possible without departing from the spirit and scope of the appended claims.

I claim:

1. a fishing rod and reel holder with means to easily attach and detach from a fishing rod that has a butt end, wherein said means remains attached to said rod during all fishing activities, said holder having means to support said rod and reel up off environmental surfaces, said holder having means to adjust said rod and reel to a variety of angles relative to the water being fished and the environmental surface, and wherein said means to attach to and from said rod has a base which supports said butt end of said rod, and has a "VELCRO" strap which encircles and snugly holds together said base and said butt of said rod.

2. a fishing rod and reel holder as described in claim 1 wherein said means to adjust to a variety of angles includes means of incorporating into the holder several pivot points with the ability to turn, said pivot points being formed from a combination of snug fitting friction "T" joints and 90 degree angle joints mounted on the ends of lengths of pipe.

* * * * *